(12) United States Patent
Shin

(10) Patent No.: US 9,296,928 B2
(45) Date of Patent: Mar. 29, 2016

(54) FLEXIBLE BISMALEIMIDE, BENZOXAZINE, EPOXY-ANHYDRIDE ADDUCT HYBRID ADHESIVE

(75) Inventor: Yun Kil Shin, Sherman Oaks, CA (US)

(73) Assignee: PROTAVIC KOREA CO., LTD., Daejeon (KR)

( * ) Notice: Subject to any disclaimer, the term of this patent is extended or adjusted under 35 U.S.C. 154(b) by 102 days.

(21) Appl. No.: 14/235,334

(22) PCT Filed: Jul. 28, 2011

(86) PCT No.: PCT/KR2011/005545
§ 371 (c)(1),
(2), (4) Date: Jan. 27, 2014

(87) PCT Pub. No.: WO2013/015469
PCT Pub. Date: Jan. 31, 2013

(65) Prior Publication Data
US 2014/0199549 A1    Jul. 17, 2014

(51) Int. Cl.
| | |
|---|---|
| *C09J 133/02* | (2006.01) |
| *C09J 161/06* | (2006.01) |
| *C09J 163/00* | (2006.01) |
| *C09J 179/04* | (2006.01) |
| *C09J 179/08* | (2006.01) |
| *C08G 59/18* | (2006.01) |
| *B32B 7/12* | (2006.01) |
| *C09D 133/02* | (2006.01) |

(52) U.S. Cl.
CPC .............. *C09J 133/02* (2013.01); *B32B 7/12* (2013.01); *C08G 59/186* (2013.01); *C09D 133/02* (2013.01); *C09J 161/06* (2013.01); *C09J 163/00* (2013.01); *C09J 179/04* (2013.01); *C09J 179/085* (2013.01); *Y10T 428/2982* (2015.01); *Y10T 428/31515* (2015.04)

(58) Field of Classification Search
CPC .... C09J 161/06; C09J 179/04; C09J 179/085; C09J 163/00; C09J 133/02; B32B 7/12; C08L 63/00; C08L 79/04; C08L 61/06; C08L 79/085; Y10T 428/2982; Y10T 428/31515
USPC ................... 428/402, 414; 423/335; 524/511; 525/135, 326.7
See application file for complete search history.

(56) References Cited

U.S. PATENT DOCUMENTS

| | | | |
|---|---|---|---|
| 5,510,425 A * | 4/1996 | Matsuura et al. | 525/423 |
| 7,488,766 B2 * | 2/2009 | Peters et al. | 524/136 |
| 2005/0137277 A1 * | 6/2005 | Dershem et al. | 522/96 |
| 2007/0088134 A1 * | 4/2007 | Suzuki et al. | 525/421 |
| 2010/0056725 A1 * | 3/2010 | Larson et al. | 525/222 |

OTHER PUBLICATIONS

International search report of PCT/KR2011/005545 mailed May 18, 2012.

* cited by examiner

*Primary Examiner* — Leszek Kiliman

(57) ABSTRACT

A resin composition which has low stress, and good adhesive property in high temperature and high moisture environments and which is useful in adhesive applications in low stress, high moisture sensitivity level electronic packages. Preferably, a flexible epoxy anhydride adduct modified solid bismaleimide and solid benzoxazine resin composition that can survive high temperature and high moisture conditions and maintain good adhesion strength and minimize the stress resulting from a coefficient of thermal expansion mismatch between a silicon die and a substrate which is Ball Grid Array solder mask or a smart card polyethylene terephthalate or silver or copper metal lead frame.

9 Claims, No Drawings

FLEXIBLE BISMALEIMIDE, BENZOXAZINE, EPOXY-ANHYDRIDE ADDUCT HYBRID ADHESIVE

TECHNICAL FIELD

This invention relates to a hybrid thermosetting resin composition for electronics packaging application device. In a particular aspect, the invention relates to hydrophobic solid bismaleimide and benzoxazine resins that have low stress, low moisture absorption, high temperature resistance and high adhesion strength properties under humid conditions (85 to 100% relative humidity) and a 260° C. solder reflow condition of the electronic package of a semiconductor.

BACKGROUND ART

Die attach adhesive compositions are used in the electronics industry to attach microchips and are generally prepared from a blend of epoxies or acrylic, polyimide, bismaleimides, cyanate ester, silicone polymer resins, hardeners, silver or silica fillers, catalysts, other ingredients such as adhesion promoters, anti-bleed agents, rheology modifiers, flexibilizers and colorants. The cured adhesives demonstrate high adhesion, high moisture resistivity, high temperature stability and good reliability. In the JEDEC (Joint Electron Device Engineering Council) test protocol for semiconductor packages consisting of an adhesive, the silicon die and the lead frame encapsulated in a molded compound are tested for reliability using a moisturization condition to simulate actual package environment condition. For example, Jedec level I conditions the packages exposed at 85° C., 85% relative humidity and 168 hours followed by 260° C., and solder reflow temperature exposure for 15 to 30 seconds for three times. Unfortunately, epoxy-hardener resin systems absorb moisture even after being cured (1 to 3 weight %). Moisture in the electronic packages can create steam pressure in the molded packages whenever packages are exposed to high humidity (85% relative humidity) and temperature above 100° C. (packages are supposed to be exposed at 260° C. or higher temperature for 15 to 30 seconds depending on solder reflow temperature), eventually build up large stress between the substrate, the silicon die and the molding compound to cause the package to delaminate. ("popcorn" in moisture sensitivity test) Low moisture absorption, lower stress and high temperature adhesion strength are the key items focused on regarding die attach adhesive performance to prevent popcorn failure in the JEDEC moisture sensitivity level test describe above. Actually, a high glass transition temperature and a high cross-linking density adhesive composition cause micro-cracking on the interface of the adhesive and the backside of a silicon die and molding compounds during package molding or reflow conditions like being exposed to 260° C. to cause delamination of the adhesive bond line between the substrate, silicon die and molding compound.

DISCLOSURE

Technical Problem

Epoxy novolac, bismaleimide and benzoxazine resins do not conventionally have flexibility due to high cross linking density, and there are also solubility difficulties in low viscosity polymer resin or solvents, have a high viscosity even after being dissolved, and the microelectronic packages have higher warpage. An object of this invention is to provide a hybrid resin composition which has excellent flexibility, low moisture absorption, high temperature resistance and high adhesion strength under high humidity conditions.

BEST MODE

This invention is a composition of: (a) 0.1 to 20 weight % of solid bismaleimide resin having a melting point between 70° C. to 260° C.; an aliphatic or aromatic or blend of (b) 0.1 to 20 weight % of solid benzoxazine monomer or resin having a melting point of 45° C. to 150° C.; (c) 1 to 50% of epoxy anhydride or epoxy phenol novolac or epoxy cresol novolac-anhydride adduct composition; and, (d) 1 to 50% of acrylic resin monomer or prepolymer resin.

[I] The first resin is a solid bismaleimide resin (abbreviation to BMI resin), having high temperature stability, hot-wet strength and fatigue resistance due to lower moisture absorption than conventional novolac or resole or epoxy resin-based adhesives. Bismaleimide monomer or prepolymer resins are commercially available as SR525 (N,N'-m-phenylene dimaleimide) from Sartomer, Homide 121 (4,4'-diphenylmethane bismaleimide) from HOS-Technik Gmbh and Matrimide 5292A from Huntsman), N,N'-(4-methyl-m-phenylene)bismaleimide, N,N'-m-phenylene bismaleimide, poly phenylmethane bismaleimide, N-phenyl maleimide, 2,6-xylylmaleimide, N-cyclohexyl maleimide, Homide 250 bismaleimide resin and Homide 400 bismaleimide resin from HOS-Technik Gmbh (Austria), BMI-1000, 1000H, 1100, 1100H, 4000, 5100, 7000, 7000H, TMH from Daiwakasei Industry Co., Ltd (Japan), TECHMITE E-2020, E-2020P from Printec corporation (Japan). However, BMI resins have a number of defects, such as a high melting temperature, high brittleness, lower adhesion and high cost. Two major drawbacks are brittleness and poor solubility in low viscosity solvents or epoxy or acrylic resin diluents. The high molecular rigidity and crosslink density of bismaleimide resin results in very low fracture toughness of the fully cured resin. Bismaleimide resins have a high melting point and high crystallinity that make difficult to dissolve them in common epoxy or acrylic diluents and the resulting solution easily recrystallizes at room temperature. Solid maleimide resin is soluble in solvents having higher evaporation, a higher boiling point and polarity such as N,N-dimethylformamide, N,N-dimethylacetamide, N-methyl-2-pyrrolidone, 1,4-dioxane, acetonitrile, acetone, methylethylketone, tetrahydrofuran and toluene, but most of them are carcinogenic and toxic substances. Also, solubility of most solid BMI resins is 1 to 79% weight which is the most of any of the illustrated solvents. However, when such solvents are used, voids are generated upon heat curing a resin composition to cause weak adhesion, moisture and volatiles to be entrapped in the bond line, and there is also bleeding on the surface of the substrate of an electronic semiconductor package and the silicon die surface is contaminated which deteriorates the wire bonding process. So, the solvent is not a good choice for dissolving solid bismaleimide and benzoxazine resin in this application.

Other reactive diluents are 2-ethyl-1-hexyl vinyl ether, cyclohexyl vinyl ether, allyl phenyl ether, 2-allyl phenol, styrene, 4-acetoxy styrene and 1-vinyl-2-pyrrolidone. The solubility of these reactive diluents may be better than previous solvents, but reactivity is poor; however, bismaleimde resin having a good affinity to the liquid form of vinyl, allyl compounds which have a vinyl functionality contained acrylolyl or methacryloyl compound such as ethylene glycol dimethacrylate, trimethylol propane and pentaerythritol; and, allylic compounds such as triallyl cyanurate, o,o'-diallyl-bisphenol A, and eugenol can be copolymerized with bismaleimide resin.

Also, there is no commercial liquid bismaleimide resin available and it is very expensive and has high viscosity. Liquid BMI resin contains premature gel particles due to UV sensitivity and a low oxygen environment. When liquid BMI resin is degassed at 758 mmHg or higher, liquid BMI resin gels by itself without any catalyst. Liquid BMI resin contains by-products due to side reactions that take place during the synthesis process like a monomer, dimer, trimer and non-reactive high molecular weight component. Purified liquid BMI resin is difficult to crystallize at room temperature or less. BMI resin also undergoes many reaction mechanisms like radical cure, Michael addition, Diels Alder reaction, Retro Diels Alder reaction, UV cure and homopolymerization. It's hard to control the curing process without precisely controlling the temperature, light, peroxide, polymerization inhibitors and oxygen level. Liquid BMI resin based die attach adhesive's hydrophobicity cause non-wetting problem with the solder mask surface and the metal lead frame surface resulting in poor interfacial adhesion which is problematic. U.S. Pat. No. 6,750,301 "Die attach adhesive with epoxy compound or resin having allyl or vinyl groups" describes a hydroxyl group containing epoxy resin blended with liquid BMI resin to wet the surface of the solder mask layer of ball grid array packages. Non-reactive polydimethylsiloxane diffuses out from the solder mask layer during the manufacturing process because of a leveling agent of the solder mask material and the defoaming agent used in the gold plating process of a Ball Grid Array substrate.

[II] The second resin, a benzoxazine resin is desirable due to its excellent thermal stability, low water absorption, high mechanical strength, high stiffness, good fatigue resistance and good corrosion resistance, good mechanical properties like near-zero shrinkage (volumetric change) upon curing, minimal side reactions and fast curing rate and a glass transition temperature that is higher than the curing temperature. Benzoxazine resin can be cured even without a catalyst near the 200° C. region. Polybenzoxazines are formed by thermally activated ring opening of the corresponding benzoxazine without any catalyst and without generating any by-products. Solid Benzoxazine resins include BF-BXZ (Bisphenol F type) benzoxazine, BS-BXZ (Bisphenol S type) benzoxazine, BA-BXZ (Bisphenol A type) benzoxazine (all manufactured by Shikoku Chemicals Corp. Japan), Bisphenol-F based benzoxazine resin (Araldite MT 35700), Bisphenol-A based benzoxazine resin (Araldite MT 35600), Phenolphthalein based benzoxazine (Araldite MT 35800), Bisphenol-S type benzoxazine (Araldite MT 35900), and Dicyclopentadiene-phenol based benzoxazine resin (Araldite MT 36000) from Huntsman. Disadvantages are high brittleness, a higher cure temperature and benzoxazine monomers are solids which need to dissolve in low viscosity resins or solvents. Processing difficulty is the same as for solid bismaleimide resin. Typical diluents are low viscosity cycloaliphatic epoxy resins like Celloxide 2021P from Daicel chemical industries Ltd, Japan and allyl substituted phenol novolac resin, Tammanol 758 from Arakawa chemical and H-4, HF-1M, HF-4M, DL-92, MEH-8000H from Meiwa plastic industries Co., Ltd, Japan.

First Resin and Second Resin Blend:

The phenolic hydroxyl functional group present in the polybenzoxazine has a strong capability to react with BMI monomer resin or BMI prepolymers that have a terminal double bond in the maleimide functional group. But, the major disadvantages of the typical polybenzoxazines are their brittleness and the high curing temperature (200° C. or higher) needed for the ring opening polymerization.

Flexibilize BMI, Benzoxazine Hybrid System:

Various attempts have been made to improve impact and fracture toughness of poly bismaleimide materials like Michael addition of nucleophiles, such as diamine, bismaleimide containing polyester groups or polyether linkage compounds. Ishida et al. used hydroxyl terminated polybutadiene rubber as a toughening modifier (Lee Y H, Allen D J, Ishida H. Effect of rubber reactivity on the morphology of polybenzoxazine blends investigated by atomic force microscopy and dynamic mechanical analysis. J. Appl Polym Sci 2006; 100: 2443-54) The epoxidized polybutadiene rubber can undergo copolymerization with the hydroxyl groups produced upon ring opening of benzoxazine, and thus can be chemically grafted into the matrix network (Ishida H, Allen D J, Physical and mechanical characterization of near-zero shrinkage polybenzoxazines. J Polym 2001; 13:S327-42) which will yield a toughened composite with higher compatibility. A melt mixing method was used to obtain rubber modified polybenzoxazines. However, a limited amount of polybutadiene resin may be present in the hybrid adhesive due to polybutadiene resin's high viscosity in low viscosity die attachment adhesive application. Also, the presence of the unsaturated structure of the butadiene system is prone to thermal instability and thus unsuitable for long term use at higher temperature. Also, polybutadiene addition to BMI, Benzoxazine resin cannot resolve both resins' brittleness by itself. Most common techniques are adding a flexibilizer like CTBN, ATBN, and polybutadiene resin, perfluorinated hydrocarbon polymer powder, poly dimethyl silsesquioxane powder, Trefil E-600 from Dow Corning Toray Co., Ltd, Japan and silicone rubber powders KMP-600 from Shin-Etsu Silicone. These flexibilizers can be used as a soft, flexible filler. Polysiloxanes have excellent thermal stability, moisture resistance, good electrical properties, low stress and lower glass transition temperature. However polysiloxanes are not compatible with epoxy resins. Mono-functional low viscosity epoxy diluents like 1,4-butanediol diglycidyl ether, dimer acid modified epoxy resin, a siloxane-epoxy compound and even a low temperature evaporating solvent like gamma butyrolactone, etc. But, CTBN, ATBN and polybutadiene resin having high viscosity and compatibility problems. Perfluorinated hydrocarbon polymer powders have fluoride ionic issues per the RoHS specification. Silsesquioxane and silicone rubber powder fillers have high cost issues and a low filler content due to particle size restrictions. Solvents cause a void and dry out during the die attachment process and cause a moisture absorption problem. Another approach is flexibilized epoxy resin systems even though they degrade solvent resistance, moisture resistance and thermal stability. Glass transition temperatures are reduced and coefficients of thermal expansions are increased. The trade offs for these reductions in performance frequently favor the use of rigid epoxies with low coefficient of thermal expansion and impact modifiers that reduce stress.

High Flexibility Epoxy Resin-Anhydride Adduct System (Well Balanced Electrical, Chemical and Mechanical Properties):

An epoxy-anhydride system is commonly used in encapsulates and underfill die attachment adhesive due to their high glass transition temperature, high temperature resistance, good electrical properties and low cost. Bisphenol-A or Bisphenol-F type epoxy resins and alicyclic anhydride cure faster than aromatic anhydride and aliphatic anhydride. There are many known curing accelerators, such as tertiary amine, boric acid esters, Lewis acid, organic metal compounds, organic metal salts and imidazole available. Long chain aliphatic acid anhydrides have a long shelf life, are flexible, and have a lower heat deformation temperature but commonly are used with other reactive anhydride and tertiary amine or imidazole accelerators. Cycloaliphatic anhydrides like methyl tetrahydrophthalic anhydride, methyl hexahydro phthalic anhydride, methylenedomethylene tetrahydrophthalic anhydride, hexahydrophthalic anhydride, tetrahydrophthalic anhydride, trialkyl tetrahydrophthalic anhydride and methyl cyclohexane dicarboxylic anhydride and mixtures thereof may be used. However, anhydrides having hygroscopic properties convert to carboxylic acid. The reason why epoxy phenol novolac-anhydrides reduce hygroscopicity and volatility of low viscosity components, also increase work life of adhesive and thixotropic index to optimize high speed dispensing nature of electronic package of semiconductor devices. Epoxy-anhydride thermosets are known to be relatively brittle. Plasticizer, reactive diluents or high molecular weight chain extenders result in flexibilization to achieve higher elongation at break. Epoxy phenol novolac resin, methylhexahydrophthalic anhydride, dodecyl succinic anhydride, maleic anhydride modified polybutadiene and sulfur functional silane are adducted at 85° C. to make them stable and non-hygroscopic and to increase toughness, give them high temperature properties and reduction of bismaleimide, benzoxazine hybrid system's brittleness. Maleinized polybutadiene resin reacts with anhydride cured epoxies; accelerate cure speed and producing an epoxy system with unique tough, cohesive failure mode of adhesion. Commercially available maleinized polybutadiene materials include Ricon130MA8, 130MA13, 130MA20, 131MA5, 131MA10, 131MA17, 131MA20, 156MA17 from Sartomer.

The third resin will be epoxy phenol novolac or epoxy cresol novolac resin. Bisphenol F and Bisphenol A type epoxy resin have compatibility issues with bismaleimide and benzoxazine resin. Mixing these resins causes phase separation during their processing and storage. Also, epoxy phenol novolac resin has more reactive groups along their chemical backbone resulting in highly crosslinked polymer rather than either bisphenol A or bisphenol F type epoxies. A higher degree of chemical crosslinking and a large quantity of aromatic ring structures increase the heat resistance and chemical resistance like a bismaleimide and benzoxazine resin. Epoxy Novolac do however require higher curing temperatures to achieve the maximum development of their properties. Epoxy novolac and combined alicyclic anhydride and aliphatic anhydrides are key to controlling the speed of curing and the flexibility of a bismaleimide, benzoxazine hybrid system. Epoxy phenol novolac resins are available commercially under the trade names Epiclon N-730, N-740, N-770, N-775, N-865 from Dainippon Ink and Chemicals Inc, DEN431, DEN438, DEN439 from Dow chemical company, Epikote 154 from Japan Epoxy resin Co., Ltd. Epoxy cresol novolac include Epiclon N-660, N-665, N-670, N-673, N-680, N-695 from Dainippon Ink & Chemicals, Inc, EOCN-102S, EOCN-103S, EOCN-104S from Nippon Kayaku Co., Ltd, UVR-6650 from Union Carbide Corp., ESCN-195 from Sumitomo Chemical Co., Ltd.

Polycarboxylic anhydrides which are formed by the dehydration condensation reaction between aliphatic di-basic acid molecules, exhibit excellent flexibility and thermal shock resistance and have been used alone or in combination with other anhydrides.

Another epoxy resin will be cycloaliphatic epoxy resin. The advantages of this resin over conventional or epoxy novolac include lower viscosities, good compatibility with benzoxazine resin, higher reactivity (faster cure speed) than aliphatic epoxy resin, high glass transition temperature, no ionic chloride impurities, higher heat distortion temperature, lower dielectric constants and excellent weatherability. An adduct of epoxy novolac or cycloaliphatic epoxy resin with the anhydride system will control the flexibility of bismaleimide, benzoxazine hybrid die attachment adhesive system. Also, epoxy resin modified bismaleimide is a well developed technique use to improve their process ability and interfacial adhesion, which also improves toughness.

The major focus of a epoxy novolac and anhydride flexible system is to lower the cross linking density of bismaleimide and benzoxazine resin to achieve a reduction in brittleness. A simple mixture of epoxy resin blending with bismaleimide resin will improve toughness, but lower the heat resistance of bismaleimide. A bismaleimide resin compatible and improve with allyl functional epoxy resin or allyl phenol novolac resin. But, the reactivity of the allyl functional group is higher than the 200° C. region which is above the typical die attach temperature. (120 to 175° C.) Unreacted allyl functional group of the epoxy resin can cause cross linking at a higher temperature region above 200° C. which will increase stress and cause micro cracking problems which in turn induce moisture absorption and moisture sensitivity level failure. Achieving the complete cure of the allyl functional group is difficult. Moreover, the cured matrix is not thermally stable due to thermal fragility of the cross linked arising from polymerization of the allyl functional group. The allyl phenyl group requires prolonged heating (nearly 6 hours) at 250° C. for curing to be carried out to a meaningful extent, which risks a degradation of other fragile groups in the network (Ambik Devin K, Raghunadhan Nair C P, Ninan K N Dual cure phenol-epoxy resins, characterization and properties. Polym polym compos 2003; 11(7):1-8). The addition of epoxy resin to benzoxazine increases the cross linking density of the thermosetting matrix and has a strong influence on its mechanical properties. Copolymerization leads to a significant increase in the glass transition temperature, flexural strain and break over those of benzoxazine homopolymer with only a minimal loss of stiffness. But the focus of this invention is to lower cross linking density to maintain flexible and tough adhesive bond line to resist high temperature resistance for 500 hours at 150° C. and high moisture exposure conditions like moisture sensitivity level I (168 hours at 85° C./85% humidity) and solder reflow temperature at 260° C. for 15 to 30 seconds and thermal cycling from −50° C. to 150° C. for 15 minutes with a thousand cycles. So, the hybrid system of epoxy novolac and anhydride modified bismaleimide, benzoxazine resins will be uniquely high performance in terms of good flexibility, toughness, moisture and a high temperature resistant adhesive.

The diluent resin that is used is an acrylic or methacrylic resin monomer or prepolymer. Reactive diluents are completely soluble and reactive when used in combination with bismaleimide and benzoxazine resins. The present invention includes monofunctional and multi-functional acrylate and methacrylates resin monomers. Also, additional diluents may be vinyl ether, cyclohexyl vinyl ether, allyl phenyl ether, 2-allyl phenyl ether, 2-allyl phenol, allyl phenol novolac resin, styrene, 4-acetoxy styrene, N-acryloylmorpholine, 1-vinyl-2-pyrrolidone, eugenol, diallyl bisphenol-A, triallyl cyanurates, divinyl benzene, ester of acrylic acids. Acryloyl morpholine showed good solubility with solid bismaleimide resin due to the similar structure between bismaleimide and acryloyl morpholine. Acryloyl morpholine is a reactive diluent in this composition. Acryloyl morpholine resin starts to polymerize at 140° C. to 170° C. which is lower than the curing temperature of bismaleimide-benzoxazine-epoxy phenol novolac hybrid system with a peroxide catalyst. A mono-functional acrylic polymer resin instead of di- or multi-functional polymer resin is used to reduce the crosslinking density which is the root cause of high stress, high warpage and micro cracking problem when exposed to high temperatures like 260° C. to 300° C. which is the temperature of the solder reflow process of semi-conductor packages. Also, a flexible curing agent slows down the polymerization speed. Acrylic monomers include acryloyl morpholine from Kojin Co., Ltd, Japan and allyl methacrylate (SR201), 1,6-Hexanediol diacrylate (SR238), 2-ethoxyethoxy ethyl acrylate (SR256), tetrahydrofurfuryl acrylate (SR285), 2-phenoxyethyl acrylate (SR339), 2-phenoxyethyl methacrylate (SR340), trimethylol propane triacrylate (SR351NS), di-trimethylolpropane tetracrylate (SR355), Isobornyl acrylate (SR506) from Sartomer and cyclohexyl methacrylate as a co monomer for bismaleimide copolymerization.

Fillers used in the practice of this invention may be electrically or thermally conductive. Electrically conductive fillers include silver, copper, gold, aluminum, graphite, carbon black, carbon nano tube, silver coated copper, silver coated glass beads, silver coated graphite, alloys of such metals and mixture of thereof, and the like. The particle size of the above metal powders, flakes and mixtures vary from the submicron scale to a maximum of about 50 micrometers. Thermally conductive fillers are alumina, aluminum nitride, boron nitride, silicon carbide, diamond, graphite, silica and the like. The surface of these electrical and thermal fillers may be modified by adding a hydrophobic coating of sulfur or thiol type silane coupling agents, hexamethyldisilazane, polydimethyl siloxane, nano and fume silica to increase the thixotropic index and hydrophilic epoxy resin, or a dimer acid to lower the thixotropic index to improve hydrophobicity and rheological properties with wet liquid and vapor sorption method to match dispensing and screen printing or stencil printing and jet dispensing methods. Surface treatment is another technique that improves the interfacial adhesion with the hydrophobic or contaminated surface of the substrate or the backside of a silicon die to achieve cohesive failure of the adhesive area. Curing agents for the epoxy resin include dicyandiamide, diaminodiphenylmethane, diaminodiphenylsulfone and metaphenylenediamine. Additional cure accelerators include to imidazoles such as 2-methyl imidazole, 2-undecylimidazole, 2-heptadecylimidazole, 1,2-dimethylimidazole, 2-phenylimidazole, 2-ethyl-4-methylimidazole, 2-phenyl-4-methylimidazole, 1-benzyl-2-methylimidazole, 1-benzyl-2-phenylimidazole, 1-cyanoethyl-2-ethyl-4-methylimidazole, 2,4-diamino-6-[2'methylimidazoleyl-(1')]-ethyl-s-triazine, 2,4-diamono-6-[2'-methylimidazolyl-(1')] ethyl-s-triazine isocyanuric acid adduct dehydrate. An adhesion promoter may be included in this composition. Examples of suitable adhesion promoters include silane coupling agents such as 26040 epoxy silane from Dow Corning, A186, A187, A174, A1289 from OSI Silquest, SI69, SI264 from Degussa. Examples of thermal radical polymerization initiators include methylethylketone peroxide, methylcyclohexanone peroxide, dicumyl peroxide, D-(4-tertiary-butyl cyclohexyl)peroxy dicarbonate, 2,5-dimethyl-2,5-di(2-ethylhexanoyl peroxy)hexane.

Composition
Solid resin
Bismaleimide
Benzoxazine
Liquid resin
Epoxy phenol novolac resin
Acrylic resin
Catalyst
Diamine
Acid anhydride
Imidazole
Peroxide
Flexibilizer
Maleinized polybutadiene resin
Additive
Silane
Filler
Silica or alumina or polymer filler or silver

MODE FOR INVENTION

The following examples serve to give specific illustrations of the practice of this invention but they are not intended in any way to limit the scope of this invention.

Example 1

Effect of Epoxy-Anhydride Adduct on Toughness and Flexibility of Hybrid Adhesive Two formulations were prepared to prove the effect of epoxy anhydride adduct on toughness which is measured by die shear strength with Dage die shear equipment series 4000 model BT-4000 using a variety of temperature and humidity conditions to satisfy moisture resistance and high temperature resistance. Also, flexibility was measured by the warpage of a silicon die attached BGA substrate with Tokyo seimitsu surface texture measuring instrument model Surfcom 120A of a rectangular bare silicon die (10×4 m/m) with a BGA substrate. The tensile modulus and glass transition temperature were measured with a dynamic mechanical analyzer. (Perkin Elmer Pyris diamond model) Solid diphenylmethane-4,4'-bismaleimide polymer, 4,4'-methylene dianiline, and N-phenyl bisphenol F benzoxazine resins were dissolved with acryloyl morpholine at 80° C. for an hour and then 4,4'-diaminodiphenyl sulfone and epoxy phenol novolac resin were added. Then the epoxy phenol novolac resin, methyl hexahydrophthalic anhydride, dodecyl succinic anhydride were mixed and heated for an hour at 85° C. to make an epoxy phenol novolac anhydride adduct. Lastly, trimethylol propane triacrylate, Maleinized polybutadiene resin, 2,4-diamino-6-[2'-methylimidazoli-(1)]-ethyl-S-triazine isocyanuric acid adduct dehydrate imidazole, 1,1-di-(t-amylperoxy) cyclohexane peroxide, glycidoxy propyl trimethoxy silane coupling agent and a silica filler were added.

TABLE 1

| | | Formulation (weight %) | |
| --- | --- | --- | --- |
| Component | Material | Inventive A | Comparative B |
| First solid resin | Bismaleimide | 3.94 | 4.58 |
| Second solid resin | Benzoxazine | 3.28 | 3.81 |
| First liquid resin | Epoxy phenol novolac | 6.10 | 6.10 |
| Adduct of first liquid resin-first liquid catalyst | Adduct of epoxy phenol novolac-acid anhydride | 8.98 | 0.00 |
| Second liquid resin | Acrylic | 30.02 | 32.82 |
| First solid catalyst | Diamine | 1.32 | 1.54 |
| Second solid catalyst | Imidazole | 1.54 | 1.79 |
| Second liquid catalyst | Peroxide | 1.40 | 1.63 |
| Flexibilizer resin | Maleinized poly butadiene | 7.85 | 6.51 |
| Additive | Silane coupling agent | 0.54 | 0.49 |
| Filler | Silica powder | 35.03 | 40.73 |

TABLE 2

| Die shear strength @25° C.<br>Bare silicon die (1.27 × 1.27 m/m)<br>to BGA substrate | Inventive formulation A | Comparative formulation B |
|---|---|---|
| after cure | 5.99 kg | 2.85 kg |
| after 121° C./100% relative humidity for 24 hours | 3.33 kg | 2.48 kg |
| after 121° C./100% relative humidity for 72 hours | 3.79 kg | 2.88 kg |
| after 121° C./100% relative humidity for 168 hours | 1.44 kg | 1.02 kg |
| after 150° C. for 168 hours | 6.28 kg | 5.38 kg |

TABLE 3

| Die shear strength @25° C.<br>Bare silicon die (4.06 × 4.06 m/m)<br>to BGA substrate | Inventive formulation A | Comparative Formulation B |
|---|---|---|
| after cure | 22.44 kg | 17.45 kg |
| after 121° C./100% relative humidity for 24 hours | 20.41 kg | 14.96 kg |
| after 121° C./100% relative humidity for 72 hours | 8.67 kg | 5.41 kg |
| after 121° C./100% relative humidity for 168 hours | 5.17 kg | 3.53 kg |
| after 150° C. for 168 hours | 44.10 kg | 22.75 kg |

TABLE 4

| Die shear strength @250° C.<br>Bare silicon die to BGA substrate | Inventive formulation A | Comparative Formulation B |
|---|---|---|
| after cure (1.27 × 1.27 m/m silicon to BGA substrate) | 0.63 kg | 0.60 kg |
| after cure (4.06 × 4.06 m/m silicon to BGA substrate) | 3.00 kg | 2.70 kg |
| after cure (10 × 4 m/m silicon to SPCLF) | 5.47 kg | 0.48 kg |

TABLE 5

| Physical properties | Inventive formulation A | Comparative Formulation B |
|---|---|---|
| Warpage (micrometers) | 26.4 | 35.03 |
| Tensile modulus @25° C. (GPa) | 1.70 | 4.50 |
| @ 150° C. (GPa) | 0.06 | 1.00 |
| @ 250° C. (GPa) | 0.16 | 1.50 |
| Glass transition temperature (° C.) | 53 | 143 |

Compare to comparative formulation B (without epoxy phenol novolac anhydride adduct), the inventive formulation A (with epoxy phenol novolac anhydride adduct) demonstrated an improved die shear strength at 25° C. and 250° C., also lower warpage, lower tensile modulus and a lower glass transition temperature which allowed it to survive moisture sensitivity level test conditions at 85° C./85% relative humidity for 168 hours plus 250° C. hot die shear conditions which reflect Infra Red reflow conditions after humidity treatment. Epoxy phenol novolac resin and the anhydride adduct system proved to significantly lower the warpage due to a lower glass transition temperature and lower tensile modulus, and also improved the high hot die shear strength. Epoxy phenol novolac resin and the anhydride adduct system lowered the viscosity of the two solid bismaleimide resins and another solid benzoxazine resin to impart them with the viscosity proper for paste type die attachment adhesives so that they can be dispenses with needle type dispensing equipment. They also eliminated brittleness and resolves the solubility problem of bismaleimide resin and benzoxazine resin. Acrylic resin is not a simple reactive diluent. It can make a homopolymerization film at 140° C. by itself, and can also copolymerize with acrylic resin and imidazole through a Michael addition reaction. Acrylic resin is a co-monomer of bismaleimide and benzoxazine resin copolymerization.

Effect of Epoxy-Anhydride Adduct Process on Toughness and Flexibility of Hybrid Adhesive Example 2

TABLE 6

| Component | Material | Formulation (weight %) | |
|---|---|---|---|
| | | Inventive A | Comparative C |
| First solid resin | Bismaleimide | 3.94 | 3.94 |
| Second solid resin | Benzoxazine | 3.28 | 3.28 |
| First liquid resin | Epoxy phenol novolac | 6.10 | 10.21 |
| First liquid catalyst | Acid anhydride | 0.00 | 4.87 |
| Adduct of first liquid resin-first liquid catalyst | Adduct of epoxy phenol novolac-acid anhydride | 8.98 | 0.00 |
| Second liquid resin | Acrylic | 30.02 | 30.02 |
| First solid catalyst | Diamine | 1.32 | 1.32 |
| Second solid catalyst | Imidazole | 1.54 | 1.54 |
| Second liquid catalyst | Peroxide | 1.40 | 1.40 |
| Flexibilizer resin | Maleinized poly butadiene | 7.85 | 7.85 |
| Additive | Silane coupling agent | 0.54 | 0.54 |
| Filler | Silica powder | 35.03 | 35.03 |

TABLE 7

| Die shear strength @25° C.<br>Bare silicon die (1.27 × 1.27 m/m)<br>to BGA substrate | Inventive formulation A | Comparative formulation C |
|---|---|---|
| after cure | 5.99 kg | 2.85 kg |
| after 121° C./100% relative humidity for 24 hours | 3.33 kg | 3.27 kg |
| after 121° C./100% relative humidity for 72 hours | 3.79 kg | 2.74 kg |
| after 121° C./100% relative humidity for 168 hours | 1.44 kg | 1.34 kg |
| after 150° C. for 168 hours | 6.28 kg | 1.23 kg |

TABLE 8

| Die shear strength @25° C.<br>Bare silicon die (4.06 × 4.06 m/m) to<br>BGA substrate | Inventive formulation A | Comparative Formulation C |
|---|---|---|
| after cure | 22.44 kg | 24.17 kg |
| after 121° C./100% relative humidity for 24 hours | 20.41 kg | 25.52 kg |
| after 121° C./100% relative humidity for 72 hours | 8.67 kg | 5.86 kg |
| after 121° C./100% relative humidity for 168 hours | 5.17 kg | 5.33 kg |
| after 150° C. for 168 hours | 44.10 kg | 3.25 kg |

TABLE 9

| Die shear strength @250° C.<br>Bare silicon die to BGA substrate | Inventive formulation A | Comparative Formulation C |
|---|---|---|
| after cure (1.27 × 1.27 m/m silicon to BGA substrate) | 0.63 kg | 0.53 kg |
| after cure (4.06 × 4.06 m/m silicon to BGA substrate) | 3.00 kg | 1.80 kg |
| after cure (10 × 4 m/m silicon to SPCLF) | 4.09 kg | 0.48 kg |

TABLE 10

| Physical properties | Inventive formulation A | Comparative Formulation C |
|---|---|---|
| Warpage (micrometer) | 26.4 | 23.40 |
| Tensile modulus @25° C. (GPa) | 1.70 | 3.36 |
| @ 150° C. (GPa) | 0.06 | 0.65 |
| @ 250° C. (GPa) | 0.16 | 0.49 |
| Glass transition temperature (° C.) | 53.0 | 136.8 |

Compare to comparative formulation C (with epoxy phenol novolac and anhydride mixture, without adduct process), inventive formulation A (with epoxy phenol novolac-anhydride adduct) demonstrated a higher die shear strength at 25° C. with bare silicon die (1.27×1.27 m/m) to a BGA substrate and 250° C. with bare silicon die to BGA substrate (4.06×4.06 m/m), also lower warpage, lower tensile modulus and a lower glass transition temperature. So, the adduct process of epoxy phenol novolac and anhydride is a unique way to improve the high temperature resistance and lower warpage performance of bismaleimide, benzoxazine and epoxy phenol novolac-anhydride adduct hybrid adhesive.

Effect of Benzoxazine on Toughness and Flexibility of Hybrid Adhesive

Example 3

Effect of Benzoxazine Resin on High Temperature Resistance

TABLE 11

| Component | Material | Formulation (weight %) | |
|---|---|---|---|
| | | Inventive A | Comparative D |
| First solid resin | Bismaleimide | 3.94 | 4.15 |
| Second solid resin | Benzoxazine | 3.28 | 0.00 |
| First liquid resin | Epoxy phenol novolac | 6.10 | 6.42 |
| Adduct of first liquid resin-first liquid catalyst | Adduct of epoxy phenol novolac-acid anhydride | 8.98 | 9.46 |
| Second liquid resin | Acrylic | 30.02 | 31.62 |
| First solid catalyst | Diamine | 1.32 | 1.39 |
| Second solid catalyst | Imidazole | 1.54 | 1.62 |
| Second liquid catalyst | Peroxide | 1.40 | 1.47 |
| Flexibilizer resin | Maleinized poly butadiene | 7.85 | 8.27 |
| Additive | Silane coupling agent | 0.54 | 0.57 |
| Filler | Silica powder | 35.03 | 35.03 |

TABLE 12

| Die shear strength @25° C.<br>Bare silicon die (1.27 × 1.27 m/m) to BGA substrate | Inventive formulation A | Comparative formulation D |
|---|---|---|
| after cure | 5.99 kg | 4.83 kg |
| after 121° C./100% relative humidity for 24 hours | 3.33 kg | 2.72 kg |
| after 121° C./100% relative humidity for 72 hours | 3.79 kg | 1.65 kg |
| after 121° C./100% relative humidity for 168 hours | 1.44 kg | 0.76 kg |
| after 150° C. for 168 hours | 6.28 kg | 0.44 kg |

TABLE 13

| Die shear strength @25° C.<br>Bare silicon die (4.06 × 4.06 m/m) to BGA substrate | Inventive formulation A | Comparative formulation D |
|---|---|---|
| after cure | 22.44 kg | 24.87 kg |
| after 121° C./100% relative humidity for 24 hours | 20.41 kg | 9.48 kg |
| after 121° C./100% relative humidity for 72 hours | 8.67 kg | 5.86 kg |
| after 121° C./100% relative humidity for 168 hours | 5.17 kg | 5.33 kg |
| after 150° C. for 168 hours | 44.10 kg | 3.25 kg |

TABLE 14

| Die shear strength @250° C.<br>Bare silicon die to BGA substrate | Inventive formulation A | Comparative Formulation D |
|---|---|---|
| after cure (1.27 × 1.27 m/m silicon to BGA substrate) | 0.63 kg | 0.46 kg |
| after cure (4.06 × 4.06 m/m silicon to BGA substrate) | 3.00 kg | 2.37 kg |
| after cure (10 × 4 m/m silicon to SPCLF) | 5.47 kg | 0.40 kg |

TABLE 15

| Physical properties | Inventive formulation A | Comparative Formulation D |
|---|---|---|
| Warpage (micrometer) | 26.4 | 28.3 |
| Tensile modulus @25° C. (GPa) | 1.70 | 5.02 |
| @ 150° C. (GPa) | 0.06 | 1.2 |
| @ 250° C. (GPa) | 0.16 | 0.82 |
| Glass transition temperature (° C.) | 53.0 | 111.5 |

Comparative formulation D (without benzoxazine resin) has a die shear strength at 250° C. lower than inventive formulation A. Benzoxazine improves the hot die shear strength as expected. It is based on benzoxazine's excellent thermal properties due to a high glass transition temperature. (The glass transition temperature of N-phenyl bisphenol F benzoxazine is 150° C. when cured for 2 hours at 180° C. and 2 to 4 hours at 200° C.) It also exhibits a lower warpage, lower tensile modulus and lower glass transition temperature.

Effect of Bismaleimide on Toughness and Flexibility of Hybrid Adhesive

TABLE 16

| Component | Material | Formulation (weight %) | |
| --- | --- | --- | --- |
| | | Inventive A | Comparative E |
| First solid resin | Bismaleimide | 3.94 | 0.00 |
| Second solid resin | Benzoxazine | 3.28 | 3.49 |
| First liquid resin | Epoxy phenol novolac | 6.10 | 6.49 |
| Adduct of first liquid resin-first liquid catalyst | Adduct of epoxy phenol novolac-acid anhydride | 8.98 | 9.56 |
| Second liquid resin | Acrylic | 30.02 | 31.96 |
| First solid catalyst | Diamine | 1.32 | 1.41 |
| Second solid catalyst | Imidazole | 1.54 | 1.64 |
| Second liquid catalyst | Peroxide | 1.40 | 1.49 |
| Flexibilizer resin | Maleinized poly butadiene | 7.85 | 8.36 |
| Additive | Silane coupling agent | 0.54 | 0.57 |
| Filler | Silica powder | 35.03 | 35.03 |

TABLE 17

| Die shear strength @25° C. Bare silicon die (1.27 × 1.27 m/m) to BGA substrate | Inventive formulation A | Comparative formulation E |
| --- | --- | --- |
| after cure | 5.99 kg | 2.78 kg |
| after 121° C./100% relative humidity for 24 hours | 3.33 kg | 2.36 kg |
| after 121° C./100% relative humidity for 72 hours | 3.79 kg | 2.47 kg |
| after 121° C./100% relative humidity for 168 hours | 1.44 kg | 1.73 kg |
| after 150° C. for 168 hours | 6.28 kg | 0.28 kg |

TABLE 18

| Die shear strength @25° C. Bare silicon die (4.06 × 4.06 m/m) to BGA substrate | Inventive formulation A | Comparative formulation E |
| --- | --- | --- |
| after cure | 22.44 kg | 23.01 kg |
| after 121° C./100% relative humidity for 24 hours | 20.41 kg | 20.10 kg |
| after 121° C./100% relative humidity for 72 hours | 8.67 kg | 9.46 kg |
| after 121° C./100% relative humidity for 168 hours | 5.17 kg | 7.01 kg |
| after 150° C. for 168 hours | 44.10 kg | 1.24 kg |

TABLE 19

| Die shear strength @250° C. Bare silicon die to BGA substrate | Inventive formulation A | Comparative Formulation E |
| --- | --- | --- |
| after cure (1.27 × 1.27 m/m silicon to BGA substrate) | 0.63 kg | 0.37 kg |
| after cure (4.06 × 4.06 m/m silicon to BGA substrate) | 3.00 kg | 1.43 kg |
| after cure (10 × 4 m/m silicon to SPCLF) | 5.47 kg | 0.89 kg |

TABLE 20

| Physical properties | Inventive formulation A | Comparative Formulation E |
| --- | --- | --- |
| Warpage (micrometer) | 26.4 | 31.8 |
| Tensile modulus @25° C. (GPa) | 1.70 | 4.71 |
| @ 150° C. (GPa) | 0.06 | 0.73 |
| @ 250° C. (GPa) | 0.16 | 0.60 |
| Glass transition temperature (° C.) | 53.0 | 110.8 |

Comparative formulation E (without bismaleimide resin) has a die shear strength at 250° C. that is lower than inventive formulation A. Bismaleimide resin improves the hot die shear strength same as benzoxazine resin. Bismaleimide resin has a high temperature resistance and lower moisture absorption than a conventional epoxy, acrylic resin based adhesive. It also exhibits a lower warpage, lower tensile modulus and lower glass transition temperature.

INDUSTRIAL APPLICABILITY

The adhesive composition of the present invention has excellent flexibility and cohesive failure mode of adhesion of silicon die to solder mask, a metal lead frame, plastic and ceramic substrate in semiconductor electronic packages like Ball Grid Array, metal lead frame, smart cards and encapsulant applications, and also has high moisture resistivity, high temperature resistivity and excellent performance under thermal cycling conditions that create reliability under the test protocol of the JEDEC Solid State Technology Association identified as JESD22-A112.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A thermosetting adhesive composition for adhering materials with a dissimilar surface consisting essentially of:
    a) a bismaleimide resin compound in solid form at room temperature;
    b) a benzoxazine resin compound in solid form at room temperature;
    c) one or more thermoset compounds selected from the group of epoxy, cycloaliphatic epoxy, acrylate, methacrylate, epoxy acrylate, epoxy phenol novolac, epoxy cresol novolac, phenol novolac, cresol novolac, and oxetane resin;
    d) optionally one or more thermoset resins and a mixture thereof; and
    e) epoxy phenol novolac and an anhydride adduct, epoxy cresol novolac and anhydride adduct, epoxy functional group contained polymer resin and an anhydride adduct.

2. The composition according to claim 1, wherein said maleimide is N-phenyl maleimide, N,N'-m-phenylene dimaleimide, 4,4'-diphenylmethane bismaleimide, diphenylmethane-4,4'-bismaleimide polymer with 4,4'-methylene dianiline, 1,3-bis(3-methyl-2,5-dioxo-1H-pyrrolinylmethyl)benzene, N,N'-(2,2'-diethyl-6,6'-dimethylene diphenylene) bismaleimide, 2,2'-bis[4-(4'-maleimidediphenoxy)phenyl]propane, N,N'-(4-methyl-m-phenylene) bismaleimide, N,N'-m-phenylene bismaleimide, poly phenyl methane bismaleimide, N-phenyl maleimide, 2,6-xylylmaleimide, N-cyclohexyl maleimide, bisphenol A diphenylether bismaleimide, 3,3'-dimethyl-5,5'-diethyl-4,4'-diphenylmethane bismaleimide, 4-methyl-1,3-phenylene bismaleimide, or 1,6-bismaleimide (2,2,4-trimethyl) hexane.

3. The composition according to claim 1, wherein said benzoxazine is N-phenyl bisphenol F benzoxazine, N-phenyl bisphenol A benzoxazine, N-phenyl Phenolphthalein benzoxazine, N-phenyl bispenol-s benzoxazine, or N-phenyl dicyclopentadiene benzoxazine resin.

4. An assembly comprising a first article permanently adhered to a second article by a cured aliquot of a composition comprising:
   a polymerizable bismaleimide and benzoxazine monomer and polymer vehicle which upon cross linking, possesses good adhesion properties;
   an acrylate monomer and epoxy phenol novolac resin vehicle which upon cross linking, possesses good adhesion properties; and
   a curing peroxide, anhydride, imidazole catalyst.

5. The composition according to claim 1, wherein said epoxy is selected from the group consisting of bisphenol A epoxy resin, bisphenol F epoxy resin, cycloaliphatic epoxy resin, phenyl containing epoxy resin, and oxetane resin.

6. The composition according to claim 1, wherein in the thermoset compound, said acrylate and methacrylate are selected from the group consisting of acryloyl morpholine, allyl methacrylate, 1,6-Hexanediol diacrylate, 2-ethoxyethoxy ethyl acrylate, tetrahydrofurfuryl acrylate, 2-phenoxyethyl acrylate, 2-phenoxyethyl methacrylate, trimethylolpropane triacrylate, di-trimethylolpropane tetracrylate, isobornyl acrylate, and isobornyl methacrylate.

7. The composition according to claim 1, wherein said solid bismaleimide resin has a melting point between 70° C. to 260° C. in the range of 0.1 to 20 weight %, an aliphatic or aromatic or blend of 0.1 to 20 weight % of solid benzoxazine monomer or resin which has a melting point of 45° C. to 150° C., 1 to 50% of epoxy anhydride or epoxy phenol novolac or epoxy cresol novolac-anhydride adduct composition, and 1 to 50% of acrylic resin monomer or prepolymer resin.

8. The composition according to claim 1, used as a die attachment adhesive, an underfilling in electronic packaging, electronic encapsulation, a matrix for composite material, or as a coating or an industrial adhesive.

9. The composition according to claim 1, used as a die attachment film is selected from the group consisting of solid bismaleimide, solid benzoxazine, epoxy acrylate or epoxy methacrylate, epoxy phenol novolac or epoxy cresol novolac and anhydride adduct, carboxy terminated butadiene rubber and a combination of these.

* * * * *